(12) United States Patent
Iwamura (10) Patent No.: US 7,672,465 B2
(45) Date of Patent: Mar. 2, 2010

(54) SYSTEM AND METHOD FOR SYNCHRONIZATION USING GPS IN HOME NETWORK

(75) Inventor: Ryuichi Iwamura, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1449 days.

(21) Appl. No.: 11/035,844

(22) Filed: Jan. 14, 2005

(65) Prior Publication Data

US 2006/0159280 A1    Jul. 20, 2006

(51) Int. Cl.
*H04B 3/00* (2006.01)
*H04R 1/02* (2006.01)
*G05B 11/01* (2006.01)

(52) U.S. Cl. .................. 381/77; 381/82; 340/310.11

(58) Field of Classification Search .......... 381/77, 381/82; 700/94; 455/402; 348/515; 340/338–338.17, 340/288

See application file for complete search history.

(56) References Cited

U.S. PATENT DOCUMENTS

| 5,481,543 | A | * | 1/1996 | Veltman | 370/473 |
| 2003/0198254 | A1 | * | 10/2003 | Sullivan et al. | 370/503 |
| 2003/0210796 | A1 | * | 11/2003 | McCarty et al. | 381/81 |

OTHER PUBLICATIONS

Yu-Ju Lin, Haniph A. Latchman, and Richard E. Newman; "A Comparative Performance Study of Wireless and Power Line Networks". IEEE Communications Magazine, Apr. 1003, pp. 54-63.

* cited by examiner

*Primary Examiner*—Xu Mei
*Assistant Examiner*—Douglas J Suthers
(74) *Attorney, Agent, or Firm*—John L. Rogitz (57) ABSTRACT

The audio speakers in a PLC-based home entertainment network receive GPS timing information. Audio packets from an audio source are timestamped with satellite timing information, so that the speakers can substantially simultaneously play audio using the timestamps and the timing information available at each speaker, thereby avoiding the echo effect caused by inadequate synchronization between speakers.

14 Claims, 5 Drawing Sheets

Figure 1
Power Line Network

Figure 3
Client TV Monitor

Figure 4
Audio Client

Figure 5

SYSTEM AND METHOD FOR SYNCHRONIZATION USING GPS IN HOME NETWORK

FIELD OF THE INVENTION

The present invention relates generally to home entertainment systems.

BACKGROUND OF THE INVENTION

Home entertainment systems have been provided that can include a set-top box media server that communicates with various components in the home, e.g., TVs, laptop computers, and custom display devices. To establish network communication paths, power line communication (PLC) networks have been introduced and have gained in popularity owing to the fact that the home's existing AC power grid is used to also carry entertainment data between various components in the home entertainment system which are plugged into AC wall sockets.

Among the current advances in PLC networking is audio streaming, in which an audio adapter having a pair of conventional analog audio input and output terminals can interconnect a source of audio, for example a CD player, to powered stereo speakers located in various rooms of the home. The user thus can listen to music from the CD player at any AC outlet. Also, the above-mentioned product can broadcast an audio stream, with two or more clients simultaneously receiving the same stream from the server so that the user can listen to music in any room in the home.

As recognized herein, while useful, the above home entertainment audio subsystem suffers from the drawback of not having an adequate synchronization mechanism between client speakers. Even when two client speakers start decoding the audio data at the same time, a delay can exist between them and can gradually grow larger over time. When the delay approaches or exceeds around thirty milliseconds, the human ear detects an echo effect that diminishes the listening pleasure.

The present invention further recognizes that simply broadcasting clock information from the server to the various home entertainment system clients is less than an optimal solution because of a lack of accuracy. For example, using Network Time Protocol principles, the difference between clocks of client devices can approach one hundred milliseconds. With the above critical recognition in mind, the invention herein is provided.

SUMMARY OF THE INVENTION

To solve the above-noted synchronization problem, the server and at least some of the audio client devices in a home entertainment system receive a radio signal such as a satellite signal, e.g., a global positioning satellite (GPS) signal, that includes time data. Thus, the server and clients share the same accurate clock without any communication between them.

Accordingly, a home entertainment system includes a source of audio and at least first and second audio speaker assemblies distanced from the source and communicating with the source using a network. Respective radio signal receivers, which may be satellite signal receivers such as GPS receivers, are associated with the source and speaker assemblies for receiving timing information that is useful for synchronization between the source and speaker assemblies.

In some implementations a first satellite signal receiver is housed with a first speaker assembly, a second satellite signal receiver is housed with a second speaker assembly, and a third satellite signal receiver is associated with the source. Logic may be provided for sending a start signal to each speaker assembly, with the start signal causing a speaker assembly receiving the start signal to buffer audio packets received from the source for a buffer period prior to playing the audio represented by the packets. Each speaker assembly may include logic for playing audio represented by the packets at least in part based on the timestamps, with the timing information received by the associated radio signal receiver also being used.

In another aspect, a method for synchronizing the playing of entertainment data streams in an entertainment network includes receiving timing information from a satellite, and using the timing information to timestamp packets in a stream of packets representing the entertainment data. The method also includes receiving, at a first player, timing information direct from a satellite, and receiving, at a second player, timing information direct from a satellite. The stream of packets is sent to both players. The method includes playing the entertainment data at both players substantially simultaneously, based on the timing information received by the players and on the timestamps.

In still another aspect, a system includes a home network, a source of audio communicating with the network, and a first speaker assembly communicating with the network. A first radio signal receiver is associated with the first speaker assembly for receiving timing information. Also, the system includes a second speaker assembly communicating with the network and a second radio signal receiver associated with the second speaker assembly for receiving timing information. Logic causes the speaker assemblies to substantially simultaneously play the same audio stream from the source based on the timing information.

BRIEF DESCRIPTION OF THE DRAWINGS

The details of the present invention, both as to its structure and operation, can best be understood in reference to the accompanying drawings, in which like reference numerals refer to like parts, and in which.

DETAILED DESCRIPTION OF THE PREFERRED EMBODIMENTS

In the preferred non-limiting embodiment shown, the processors described herein may access one or more software or hardware elements to undertake the present logic. The flow charts herein illustrate the structure of the logic modules of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer or microprocessor) to perform a sequence of function steps corresponding to those shown. Internal logic could be as simple as a state machine.

In other words, the present logic may be established as a computer program that is executed by a processor within, e.g., the present microprocessors/servers as a series of computer-executable instructions. In addition to residing on hard disk drives, these instructions may reside, for example, in RAM of the appropriate computer, or the instructions may be stored on magnetic tape, electronic read-only memory, or other appropriate data storage device.

Figure 1:
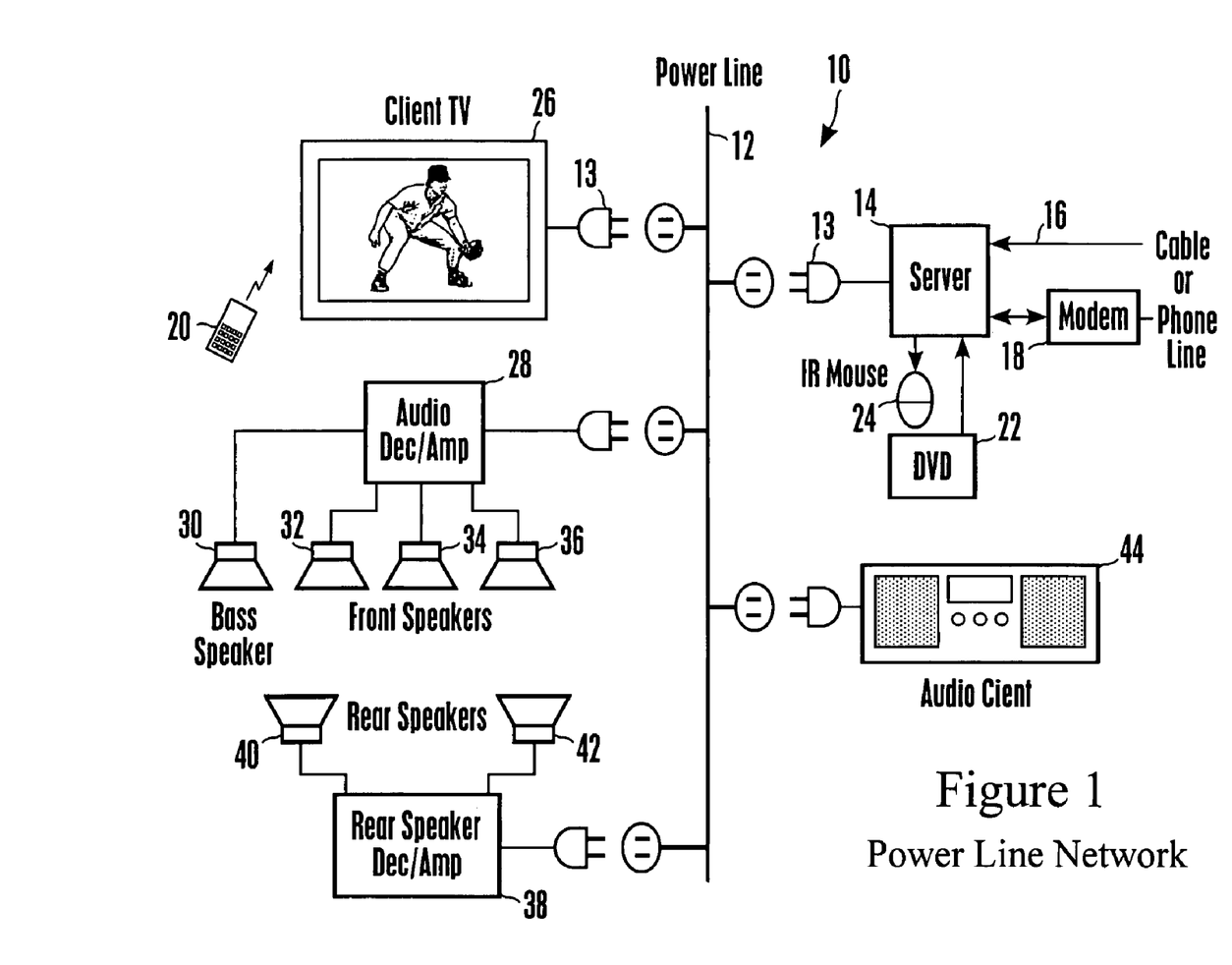
FIG. 1 is a block diagram of a non-limiting exemplary home entertainment system.

Referring initially to FIG. 1, a home entertainment system is shown, generally designated 10, that includes a communication network 12. In the embodiment shown the network 12 can be a power line communication (PLC) network that interconnects various network devices which are plugged into the AC grid of a home using respective AC power plugs 13. Other types of wired or wireless networks may be used.

The network devices can include one or more servers 14. The non-limiting server 14, which may be implemented as a set-top box, receives a signal from a cable 16 and/or Internet data from a modem 18 that may be, for example, a cable modem or an ADSL telephone line modem. Also, the server 14 may receive remote commands through the power line network 12 such as, e.g., channel up/down initiated from a remote commander 20. The server 14 can send and receive audio/video (A/V) streams commands and data over the network 12.

In some implementations a DVD player 22 may be connected to the server 14. The server 14 can receive a remote command from another device such as the remote commander 20 and forward it to the DVD player 22 using, e.g., an infrared (IR) mouse 24.

Also, a client TV system 26 can communicate with the network 12. The client TV system 26 can include one or more audio speaker assemblies, and can receive a video stream and exchange commands and data over the network 12. Thus, for instance, the client TV system 26 can receive a command from the remote commander 20 and forward the command to a destination, for example, to the server 14.

FIG. 1 also shows that the system 10 may include an audio decoder/amplifier unit 28 that receives an audio stream from, e.g., the server 14 through the network 12. As set forth more fully below, the audio unit 28 decodes the stream and outputs audio signals to plural speakers, including, e.g., a bass speaker 30, a front-left speaker 32, and center speaker 34, and a front-right speaker 36. Similarly, a rear speaker decoder/amplifier unit 38 can receive an audio stream from the server 14 and can output an audio signal to each of a rear-left speaker 40 and a rear-right speaker 42. The audio components 28-42 may be audio-only, i.e., none of the audio components 28-42 need include a video monitor.

In addition to the audio components above, the system 10 may include an inexpensive audio boom box 44 that can receive audio streams from the server 14 for decoding and playing. The boom box 44 may receive a remote command and forward it to the server 14.

Figure 2:
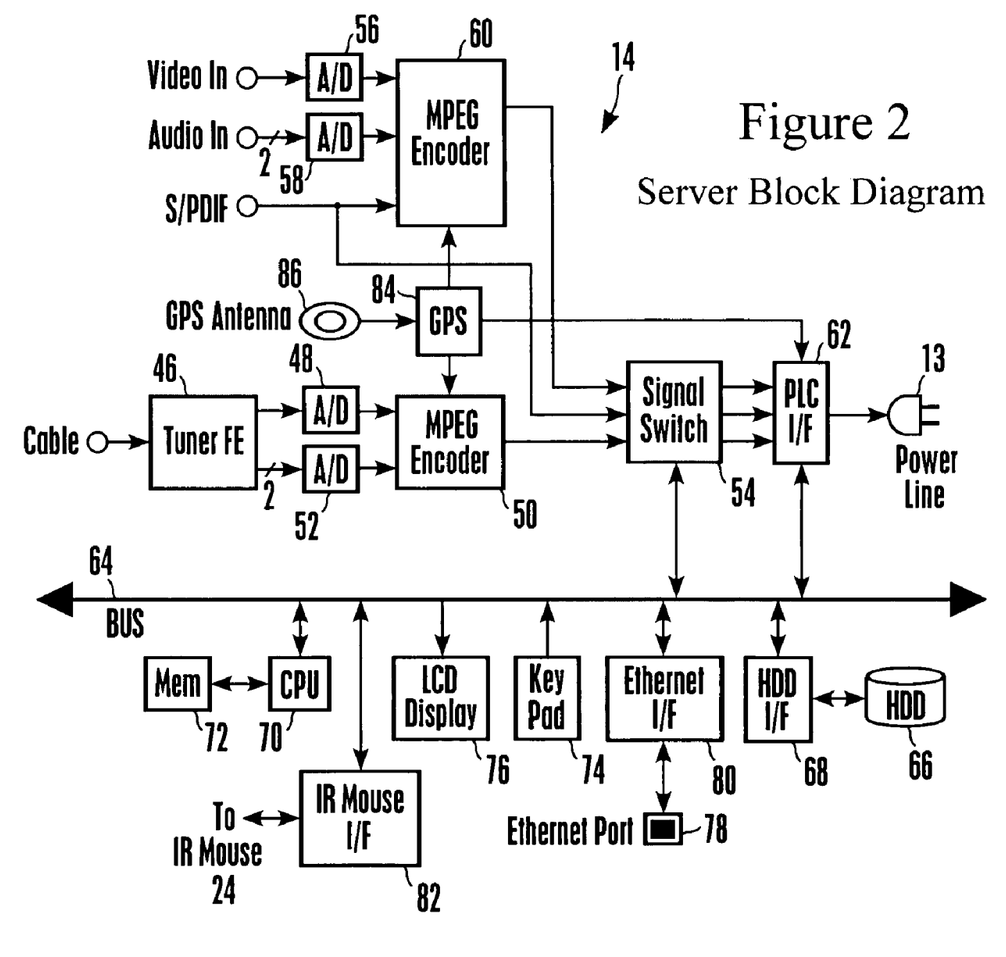
FIG. 2 is a block diagram of a non-limiting exemplary server in the system.

FIG. 2 shows aspects of one non-limiting server 14, the components of which that are illustrated in FIG. 2 may be contained in a single housing. As shown, the server 14 may include an analog cable signal that is tuned and demodulated in a tuner frontend 46. The video output from the tuner frontend 46 can be digitized in an analog to digital converter (ADC) 48 and MPEG-encoded in a broadcast MPEG encoder 50. Similarly, the audio output from the tuner frontend 46 is digitized at an ADC 52 and MPEG encoded in the broadcast MPEG encoder 50. The output stream from the broadcast MPEG encoder 50 may be sent to a signal switch 54.

FIG. 2 also shows that video and audio outputs from the DVD player 22 shown in FIG. 1 can be digitized in respective ADCs 56, 58 and MPEG-encoded in a DVD MPEG encoder 60. The output of the DVD MPEG encoder 60 may be sent to the signal switch 54 as shown. When S/PDIF (IEC 60958) protocol is used, the digital audio signal may directly go to the DVD MPEG encoder 60. The digital audio signal is also connected to the signal switch 54 for audio only use.

As shown in FIG. 2, the signal switch 54 can send a selected stream to a server PLC interface 62, which is plugged into the exemplary PLC network 12 via a plug 13. Also, the server 14 includes an internal server bus 64 that is connected to the server PLC interface 62 (and, hence, to the network 12), and the signal switch 54 may forward a stream to a hard disk drive (HDD) 66 through the bus 64 and a HDD interface 68 for recording. The bus 64 is, for example, a PCI bus. A playback stream from the HDD 66 may be returned to the signal switch 54 and sent to the server PLC interface 62 for transmission to other components discussed further below. The server PLC interface 62 can time-multiplex input signals and send them to the network 12 shown in FIG. 1.

The server 14 may also have a server CPU 70 that controls the components of the server 14 through the server's internal bus 64 and that executes control software in accordance with logic set forth herein. The control software may be stored in, e.g., a solid state memory 72. An input device such as but not limited to a keypad 74 can be used to input data to the server CPU 70 through the server internal bus 64. Also, an output device such as an LCD 76 can be used to indicate data sent from the server CPU 70, for example, tuning status, network status, error messages, etc. The modem shown in FIG. 1 may be connected to an Ethernet port 78 for conveyance of data to the server CPU 70 through an Ethernet interface 80. Thus, it may now be appreciated that the server CPU 70 can control the HDD 66 to store data from the Internet and/or from, e.g., the DVD player. For playback, the data is sent to the signal switch 54 and then to the server PLC interface 62 for transmission. If desired, an IR mouse interface 82 can also be provided for communicating with the IR mouse 24 shown in FIG. 1.

In accordance with present principles, a radio receiver such as a global positioning satellite (GPS) receiver GPS 84 is associated with the server 14 to receive, e.g., satellite signals including timing information from a server antenna 86 for obtaining a time reference. The timing information is sent to the MPEG encoders 50, 60 (as well as, e.g., the server CPU 70) and is used to derive an internal server clock signal. Also, when the server PLC interface 62 must timestamp the A/V stream, it receives the satellite timing information. Accordingly, data packets such as audio packets can be timestamped based on the satellite reference time. Preferably, the clock signal derived from the satellite timing information is locked by an internal PLL (Phase Locked Loop) in the GPS receiver 84.

Figure 3:
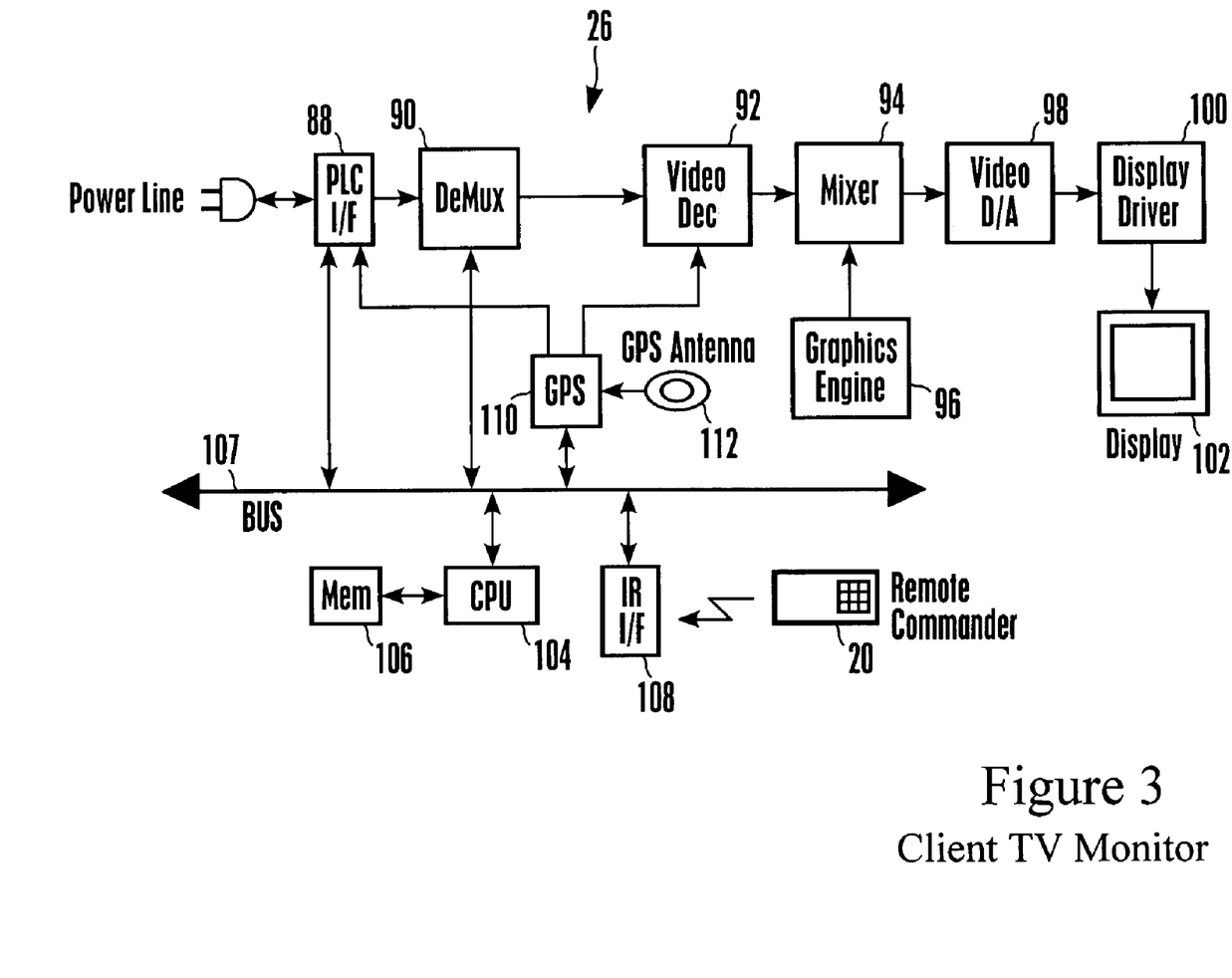
FIG. 3 is a block diagram of a non-limiting exemplary client TV in the system.

FIG. 3 illustrates a block diagram of the TV 26, the components of which may be contained in a single housing. A TV PLC interface 88 can receives a signal sent over the network 12. The output signal from the TV PLC interface 88 is demultiplexed in a demultiplexer 90 and sent to a video decoder 92. The decoder 92 outputs a signal to a mixer 94, wherein decoded video signals may be, if desired, mixed with graphics data (On Screen Display data) generated in a graphics engine 96. The signal is then sent to a digital to analog converter (DAC) 98 for analogizing the data for processing thereof in a display driver 100. The display driver 100 sends video signals to a video display 102.

As shown in FIG. 3, a TV CPU 104 can be provided for communicating with various TV components over an internal data bus 106, which is connected to the TV PLC interface 88 (and, hence, to the network 12) as shown. The TV CPU 104 consequently can communicate asynchronous data such as commands, data, etc. The TV CPU 104 can execute control software in accordance with logic herein. The software can be stored in a TV memory 106.

If desired, an infrared communication interface 108 can be provided for receiving commands from the remote commander shown in FIG. 1. Received commands may be sent to the TV CPU 104 through the internal TV bus 107.

In accordance with present principles, a TV GPS receiver 110 receives timing information in satellite signals from a TV GPS antenna 112. The timing information is used to generate an internal TV clocking signal which is substantially coincident to the internal server clock signal and to the below-described component clock signals owing to having been derived from the same satellite signals. The TV CPU 104 and/or other TV system components can receive the timing information for execution as set forth further below.

Figure 4:
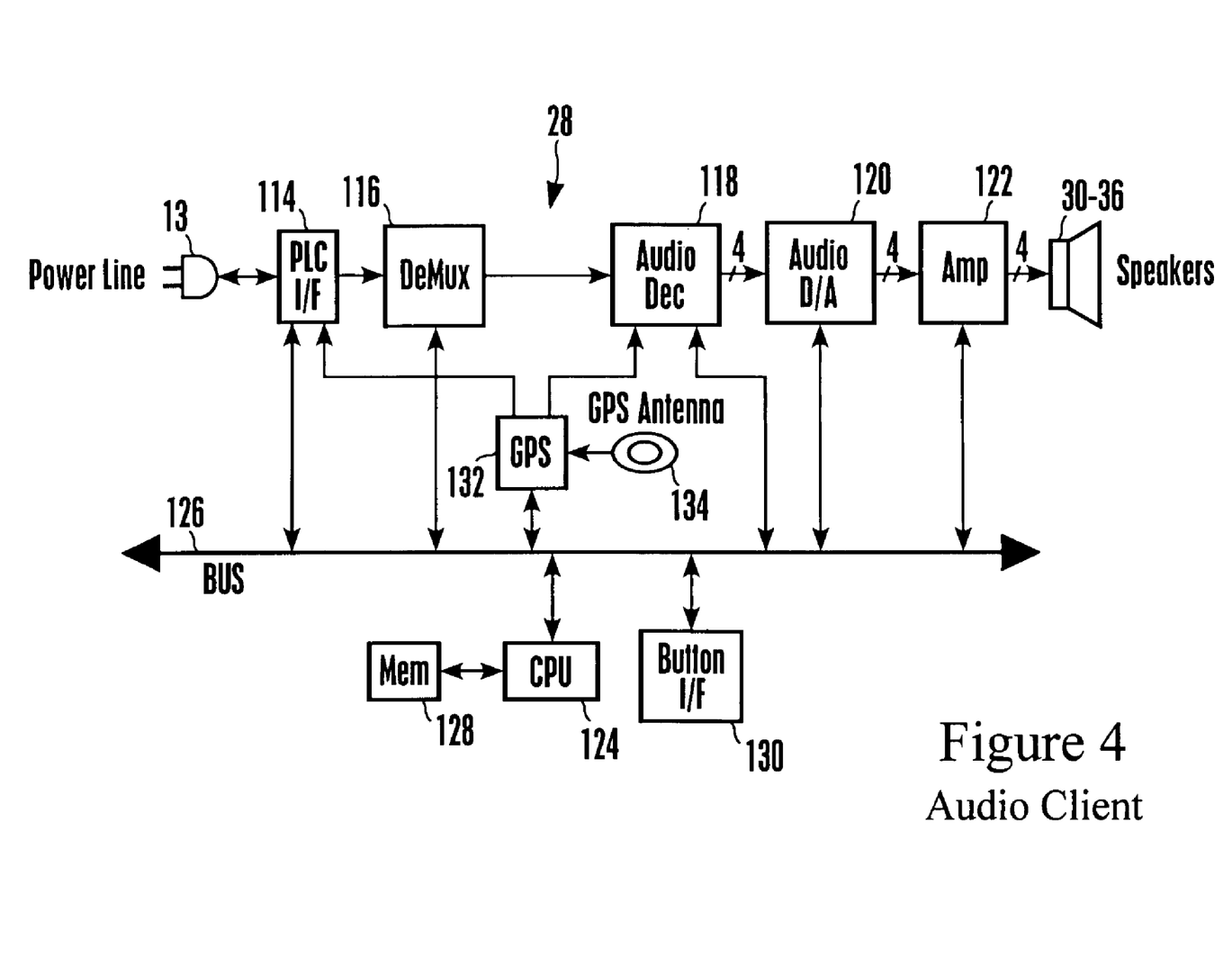
FIG. 4 is a block diagram of a non-limiting exemplary audio client.

FIG. 4 shows that the audio decoder/amplifier unit 28 shown in FIG. 1 can include an audio PLC interface 114 that communicates with the network 12 through a power plug 13. It is to be understood that the audio components 38, 44 shown in FIG. 1 may be substantially similar to the unit 28 shown in FIG. 4, with differences implemented in accordance with well-known principles based on the number of the channels and speakers involved. It is to be further understood that the components shown in FIG. 4 may be contained in a single housing.

The output signal from the audio PLC interface 114 is demultiplexed in a demultiplexer 116 and decoded in an audio decoder 118. The decoded signal can be analogized in a DAC 120, amplified in an amplifier 122, and sent to the speakers 30-36 shown in FIG. 1. Thus, the unit 28 shown in FIG. 4 is one non-limiting example of a speaker assembly, it being understood that the components 38, 44 are further examples of speaker assemblies and indeed that the TV system 26 is yet another example of a speaker assembly, albeit one containing a video monitor.

An audio CPU 124 can control the components of the unit 28 in accordance with logic below. The CPU 124 and unit 28 components communicate as shown through an internal audio bus 126, to which the audio PLC interface 114 (and, hence, network 12) is connected. The audio CPU 124 executes control software in accordance with logic herein and stored in a memory 128. The audio CPU 128 may exchange asynchronous data with the server CPU 70 through the audio PLC interface 114. If desired, a button interface 130 can be provided to allow a user to select a channel and volume.

In accordance with present principles, a radio receiver such as an audio assembly GPS receiver 132 can receive satellite information including timing information direct from, e.g., a satellite through an antenna 134. The timing information can be used to derive an internal audio component clock signal that is substantially coincident with the clock signals of the other components. Accordingly, no clocking or synchronization information (apart from data packet timestamps) need be exchanged over the network 12. The timing information or derivatives thereof can be sent to the audio decoder 118, which uses the timing information to decode data.

Figure 5:
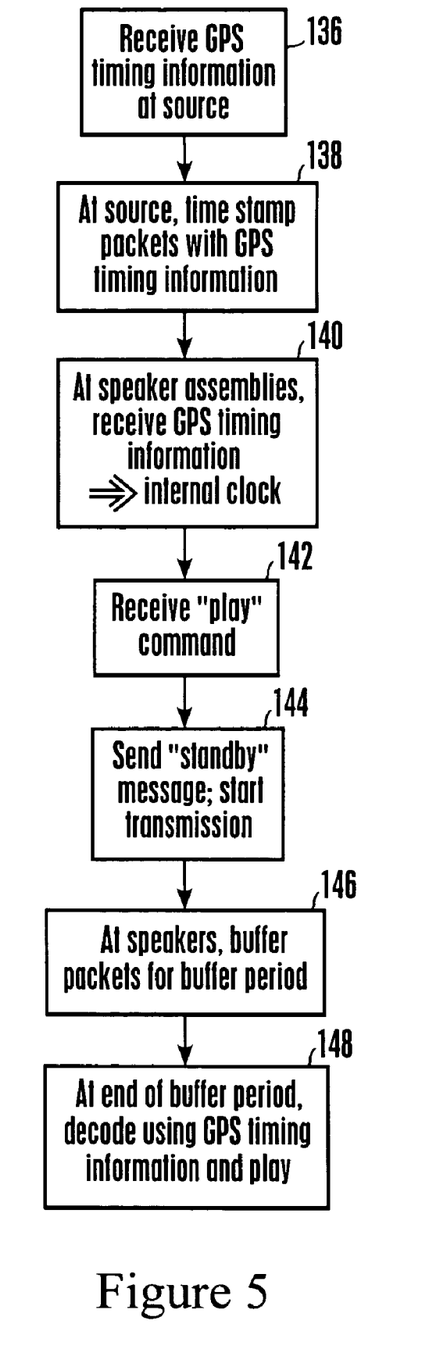
FIG. 5 is a flow chart of non-limiting exemplary synchronization logic.

FIG. 5 shows the logic that can be executed by the computing devices described above. At block 136 radio-borne timing information such as GPS timing information is received by the server 14 which is a one example of a source of audio streams. Moving to block 138, the timing information is used by the server 14 to timestamp audio packets and, if desired, to establish an internal clock signal for the server 14. Also, at block 140 the various speaker assemblies such as, e.g., the unit 28 (with associated audio speakers) receive their own timing information direct from, e.g., the satellite through their own respective GPS receivers disclosed above. As mentioned previously, each speaker assembly can derive its own internal clock signal from the satellite timing information, so that, while the various internal clocks might not exactly match, they match substantially closely with each other, given the high accuracy of the GPS timing information.

When a "play" command is received at block 142 from, e.g., the remote commander 20, the logic moves to block 144, wherein the server 14 sends each audio client (i.e., each speaker assembly that is to play the selected audio stream) a start command, after which the server 14 starts transmitting the selected audio stream to the audio clients over the network 12. The start command includes a delay time that is sufficiently long to allow each audio client to buffer incoming data and to prepare for decoding. For example, the buffer period may be three seconds. Note that the start command does not have to reach each client at the exact same time because decoding starts a relatively long time (two to three seconds) after all of the clients receive the command.

At block 146, the audio clients start buffering received packets. For example, the client TV system 26 receives the start command and starts audio and video buffering. Also, the audio-only clients such as the audio decoder/amplifier unit 28 start buffering.

At the elapse of the buffer period at block 148, the various clients start decoding. Note that the packet with timestamp $t_0$ is decoded at time $t_0$ by the internal clock of the client plus the buffer period received from the server 14, it being understood that the packet $t_0$ was time-stamped in the server 14 at time $t_0$ by the internal clock of the server which, it will be recalled, is very close to the internal clocks of the clients owing to the very high accuracy of the preferred GPS timing information. If the server PLC interface 88 needs to inject packets based on the timestamp, the time value and clock signal are sent to it. The clock of a component may be locked by the internal PLL of the associated GPS receiver, with the clock rate difference between the various system 10 components being negligible. Thus, in contrast to other systems in which a not insubstantial clock rate difference exists between the server and client players, requiring the client players to adjust their clocks with phase-locked loops to follow the incoming stream, in the system 10 every relevant component works based on the same GPS.

It is to be understood that while the disclosure above focusses on a PLC network, the present principles apply equally to other wired or wireless networks. Moreover, the present principles may be applied for two or more networks connected with a bridge or a router.

Further, the present invention recognizes that streaming data can be sent component to component over the internal buses described above, and when an internal bus is busy, jitter or delay may occur in the streaming data. In the system 10, each decoder advantageously decodes the stream at the reference clock generated by the GPS block, so that no delay is caused at all. Also, radio clocks other than GPS can be used, for example, WWV or DCF77. These other radio clocks use a long wave frequency, which can be easier to receive than GPS signals. A drawback to non-GPS radio clocks, however, is that the resolution may be too coarse, requiring PLL control to divide one pulse per second, for example, into one thousand pulses per second.

With the preferred invention shown in the figures, all network devices run based on very accurate GPS timing information, such that no decoding delay occurs between clients. Also, because the GPS receivers supply the phase-locked loop signals to the other components, no additional PLL are required. The principles advanced herein do not depend on network layout, bridging or routing, and can be applied to two or more networks connected with a bridge or a router.

While the particular SYSTEM AND METHOD FOR SYNCHRONIZATION USING GPS IN HOME NETWORK as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for".

What is claimed is:

1. A home entertainment system, comprising:
    at least one source of audio;
    at least first and second audio speaker assemblies distanced from the source, the assemblies communicating with the source using a network; and
    respective radio signal receivers associated with the source and speaker assemblies that receive at least timing information, the timing information being useful for synchronization between the source and speaker assemblies, wherein at least some audio packets are time-stamped based on the timing information received by the radio signal receiver associated with the source prior to transmission to the speaker assemblies, wherein the speaker assemblies use the timing information received from their respective radio signal receivers to display audio based on the audio packets such that no clocking or synchronization information is exchanged, between the source and the receivers other than timestamps of the audio packets.

2. The system of claim 1, wherein the radio signal receivers are satellite signal receivers, and a first satellite signal receiver is housed with a first speaker assembly, a second satellite signal receiver is housed with a second speaker assembly, and a third satellite signal receiver is associated with the source.

3. The system of claim 1, comprising logic for sending a start signal to each speaker assembly, the start signal causing a speaker assembly receiving the start signal to buffer audio packets received from the source for a buffer period prior to playing the audio represented by the packets.

4. The system of claim 3, wherein each speaker assembly includes logic for playing audio represented by the packets at least in part based on the timestamps and using the timing information received by the radio signal receiver associated with the speaker assembly.

5. A method for synchronizing the playing of entertainment data streams in an entertainment network, comprising:
    receiving timing information from a satellite;
    using the timing information from the satellite to timestamp at least some packets in a stream of packets representing the entertainment data;
    receiving, at a first player, timing information direct from a satellite;
    receiving, at a second player, timing information direct from a satellite;
    sending the stream of packets to both players;
    playing the entertainment data at both players substantially simultaneously based at least in part on the timing information received by the players and on the timestamps; and
    responsive to a play command to play a data stream, sending a start signal to each speaker assembly, the start signal causing a speaker assembly receiving the start signal to buffer audio packets received from a source for a predetermined buffer period prior to playing the audio represented by the packets, only at the elapse of the predetermined buffer period the speaker assemblies commencing play of the audio stream.

6. The method of claim 5, wherein the network is a power line communication (PLC) network.

7. The method of claim 6, wherein the players include audio speaker assemblies.

8. The method of claim 7, wherein at least one speaker assembly includes a video monitor.

9. The method of claim 7, wherein no speaker assemblies include video monitors.

10. A system for a home network, comprising:
    at least one source of audio communicating with the home network;
    at least a first radio signal receiver associated with the source that receives satellite timing information;
    at least a first speaker assembly communicating with the home network;
    at least a second radio signal receiver associated with the first speaker assembly that receives timing information;
    at least a second speaker assembly communicating with the home network;
    at least a third radio signal receiver associated with the second speaker assembly for that receives timing information; and
    logic for causing the speaker assemblies to substantially simultaneously play the same audio stream from the source based at least in part on the their received timing information, wherein the source transmits packets of data to the speaker assemblies, at least some packets bearing timestamps, the timestamps being derived from the satellite timing information available to the source, wherein the source responsive to a user-generated "play" command sends a start signal to each speaker assembly, the start signal causing a speaker assembly receiving the start signal to buffer audio packets received from the source for a predetermined buffer period prior to playing the audio represented by the packets, wherein only at the elapse of the predetermined buffer period do the speaker assemblies commence play of the audio stream.

11. The system of claim 10, wherein the network is a power line communication (PLC) network.

12. The system of claim 10, wherein at least one speaker assembly includes a video monitor.

13. The system of claim 10, wherein no speaker assemblies include video monitors.

14. The system of claim 10, wherein the radio signal receivers are global positioning satellite (GPS) receivers.

* * * * *